United States Patent [19]

Bose

[11] Patent Number: 5,388,186
[45] Date of Patent: Feb. 7, 1995

[54] DIFFERENTIAL PROCESS CONTROLLER USING ARTIFICIAL NEURAL NETWORKS

[75] Inventor: Chinmoy B. Bose, Green Brook, N.J.

[73] Assignee: AT&T Corp., Murray Hill, N.J.

[21] Appl. No.: 11,568

[22] Filed: Feb. 1, 1993

[51] Int. Cl.⁶ .................. G06F 15/18; G05B 23/02
[52] U.S. Cl. ....................................... 395/11; 395/22; 395/903
[58] Field of Search ................. 395/11, 902, 903, 22, 395/904, 906

[56] References Cited

U.S. PATENT DOCUMENTS

5,159,660 10/1992 Lu et al. ............................. 395/22
5,285,377 2/1994 Sugasaka et al. ................. 395/903

OTHER PUBLICATIONS

Wang et al, "Unsupervising Adaption Neural–Network Control".
Pourboghart et al, "Neural Network Models for the learning control of Dynamic systems with Application to Robotics".
Wang et al, "Self-Adaptive Neural Architectures for Control Applications", IJCNN, Jun. 17–21, 1990.
Suddarth et al, "Asymbolic–Neural Method for Solving Control problems", IEEE Int. Conf. on Neural Network, Jul. 24–27, 1988.
Nguyen et al, "Neural Networks for Self–Learning Control Systems" IEEE Control System Magazine, 1990.
Bleuler et al, "Nonlinear Neural Network Control with Application Example", Inter. Neural Network Conf., INNC, Jul. 9–13, 1990.
Sobajic et al, "Robust Control of Nonlinear Systems Using Pattern Recognition", Proc. 1989 IEEE Conf. on Systems, Man and Cyber.
Guez et al, "Neural Network Architecture for Control", IEEE Control System Magazine, 1988.
D. Psaltis, A. Sideris, and A. A. Yamamura, "A Multi-layered Neural Network Controller," *IEEE Control Systems Magazine*, Apr. 1988, pp. 17–21.
E. A. Rietman and R. C. Frye, "Neural Control of a Nonlinear System with Inherent Time Delays," ACM Conference 1991, Analysis of Neural Network Applications, ANNA-91, May 29–30, 1991.

Primary Examiner—Allen R. MacDonald
Assistant Examiner—George Davis
Attorney, Agent, or Firm—Robert B. Levy

[57] ABSTRACT

Control of a process in accordance with both optimal process values ($t_d$), which may be fixed or slowly varying, and actual process output values ($t_{r-1}$) generated during a previous interval ($r-1$) is accomplished by a differential process controller (10). The controller (10) employs two artificial neural networks (36 and 38), each generating a separate intermediate control vector for controlling the process in accordance with a separate one of the vectors $t_d$ and $t_{r-1}$. A first summing amplifier (42) computes the difference between the intermediate control vectors and generates a differential control vector which varies accordingly. A second summing amplifier (44) sums the differential control vector, together with the output signal of the summing amplifier generated during the immediately previous interval ($r-1$), to generate a control signal $c_r$ for controlling the process.

8 Claims, 2 Drawing Sheets

DIFFERENTIAL PROCESS CONTROLLER USING ARTIFICIAL NEURAL NETWORKS

Technical Field

This invention relates to a method and apparatus which employs at least one artificial neural network for iteratively controlling a process in accordance with both a set of optimal process output values and a set of actual process output values generated during a previous iteration.

Background of the Invention

The manufacture of high quality product on a repeated basis requires accurate control of the manufacturing process. The fabrication of semiconductor wafers by the well-known planar process is no exception to this rule. Among the steps carried out to fabricate a semiconductor wafer by the planar process is that of epitaxial layer growth whereby a semiconductor wafer is subjected to chemical vapor deposition to grow up layers of atoms on the surface of the wafer. With silicon semiconductor devices, such chemical vapor deposition is typically carried out by heating the wafers in a reactor while hydrogen and silicon tetrachloride are reacted, or alternatively, silane is decomposed, to deposit silicon atoms on the wafer surface.

To obtain high quality semiconductor devices, the thickness of each layer of atoms grown on the wafer by chemical vapor deposition should be uniform across the wafer surface. The conventional approach to controlling layer thickness is to fabricate a small batch of wafers and then measure the layer thickness uniformity. To compensate for any such non-uniformity, adjustments are then made to the process. Once such adjustments are made, another batch of wafers is fabricated and thereafter, the layer thickness again measured. Depending on the degree of layer thickness uniformity that is wanted, these steps may be carried out many times.

In an effort to obtain more precise control of manufacturing processes, including the above-described chemical vapor deposition process, artificial neural networks have been employed. Such artificial neural networks are comprised of a plurality of simple computing elements, a number of which function as simple, nonlinear summing nodes, connected together with varying strengths, to mimic the operation of the human brain. A typical artificial neural network is comprised of a plurality of such nodes arranged in two or more layers, with the nodes in the first layer typically each serving to receive a separate one of the input signals and distribute the signal to a separate one of the nodes in the second layer. The nodes in the second layer each function as a non-linear summing node to transform the input signals supplied thereto from the nodes in the previous layer for receipt as an output of the network if only two layers are present, or if a third layer of nodes is present, for receipt at the input of the nodes in such a layer. The nodes in each subsequent layer transform the signal received thereto, with the nodes in the last layer yielding a separate one of the network output signals.

Each node in the artificial neural network (except those nodes in the first layer) serves to: (1) multiply each incoming input signal by a separate scaling factor (referred to as a connection weight), (2) sum the resulting weighted signals, and (3) transform the sum according to a non-linear relationship, such as a sigmoid or tan-hyperbolic function. The artificial neural network is "trained," that is to say, the connection weights of the nodes in the second and subsequent layers are adjusted in accordance with past data so that the network serves as an inverse model of the process being controlled. In other words, the artificial neural network functions to transform a set of actual output values of a process to yield a process-driving signal to control the process to produce output values more closely approximating a desired set of values.

The disadvantage of most present-day control schemes that employ artificial neural networks is that there is little, if any, feedback of the actual process output signals back into the neural network. As a result, process control is less precise, a distinct disadvantage. Further, most present day control schemes using artificial neural networks are not responsive to the differences between actual process values and a predictor of the process.

In practice, there is generally a difference between the process characteristics and the predictor or estimator. These differences may be due to predictor error, process drift, the failure to account for the effect of an unknown or excluded parameter, or some other reason.

Thus there is a need for an artificial neural network control system that is robust to the differences between the predictor and the process under the conditions where the first and second order statistics do not change.

Summary of the Invention

Briefly, in accordance with a preferred embodiment of the invention, there is provided a differential process controller for iteratively controlling a process, by generating a process-driving signal vector $c_r$ at a time r, in accordance with a set of optimal or desired process output values in the form of a vector $t_d$ (which values may be fixed or slowly varying) and with a set of process output values (i.e., a vector) $(t_{r-1})$ actually generated during a previous observation $r-1$. The process controller of the invention comprises a first artificial neural network supplied at its input with a set of values representing the optimal process output value vector components $t_d$. A second artificial neural network is supplied with a vector $(t_{r-1})$ representing actual process output values, generated by the process being controlled, during a previous observation $r-1$. (Instead of employing two artificial networks, a single network could be employed to process the vectors $t_d$ and $t_{r-1}$ sequentially.) Each of the first and second artificial neural networks serves to inversely model the process being controlled by transforming the input values supplied thereto, in accordance with the model characteristics based on training data, to generate process-driving signals for controlling the process to obtain a set of desired output values. A first summing amplifier computes the difference between the first and second artificial neural network output signals to yield a differential control vector $(\Delta c_r)$. A second summing amplifier sums the differential control vector $\Delta C_r$ with the process-driving control vector $(c_{r-1})$ generated by the second summing amplifier during a previous observation $(r-1)$, to yield a control vector $(c_r)$ that drives the process.

DETAILED DESCRIPTION

Figure 1:
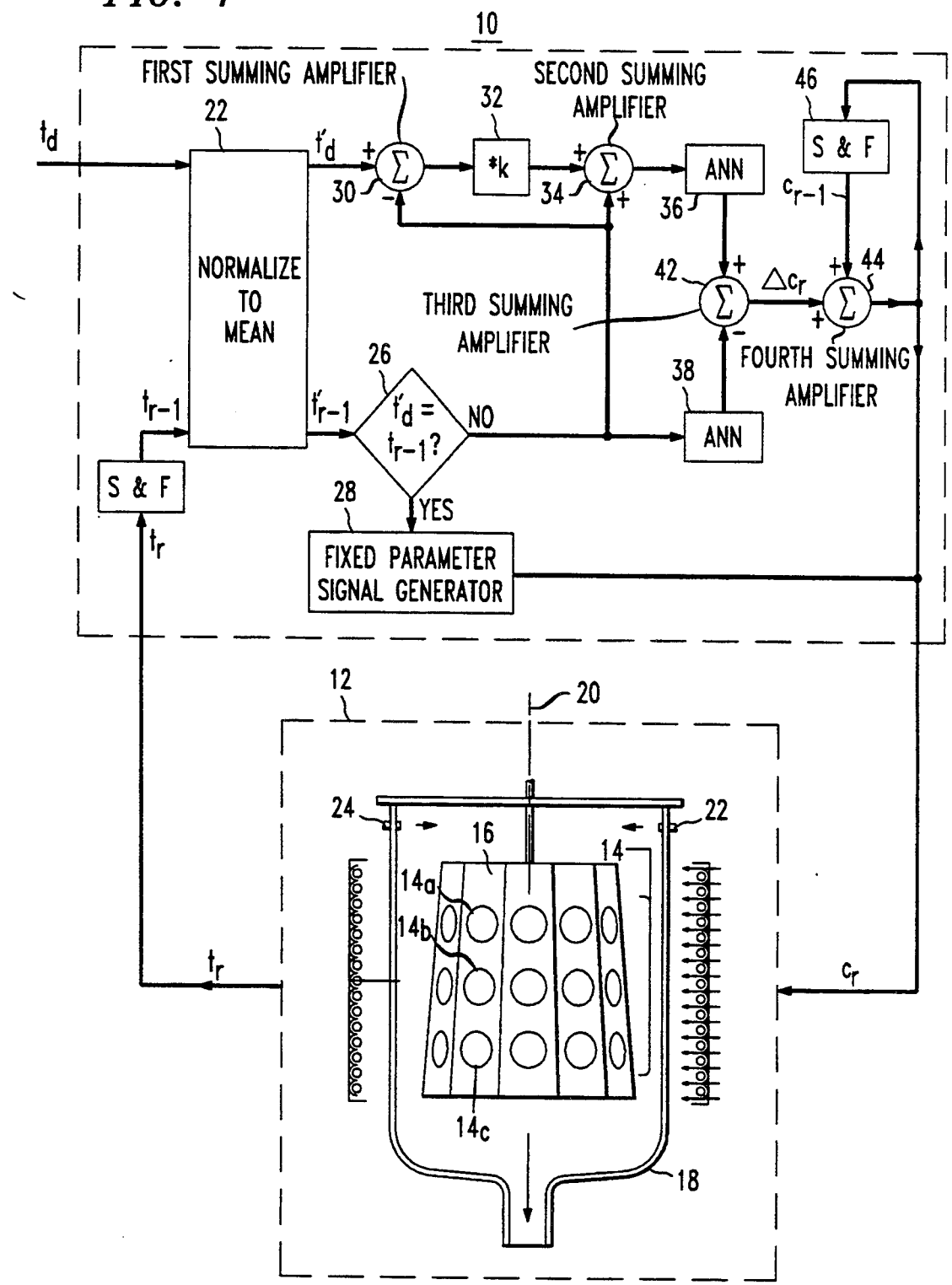
FIG. 1 is a block diagram of a differential process controller, in accordance with the invention, for controlling a chemical vapor deposition system.

In FIG. 1 there is shown a block diagram of a differential process controller 10, in accordance with a preferred embodiment of the invention, for controlling a prior—art chemical vapor deposition reactor 12 which serves to epitaxially grow layers of atoms on a batch of semiconductor wafers 14. As will be appreciated from a detailed discussion of the invention provided hereinafter, the reactor 12 is merely exemplary of a wide variety of process equipment capable of being controlled by the controller 10 of FIG. 1.

To understand the manner in which the controller 10 operates to control the chemical vapor deposition reactor 12, a brief overview of the chemical vapor deposition system will prove useful. In the illustrated embodiment, the chemical vapor deposition system 12 typically comprises a susceptor 16 situated in a glass bell jar like enclosure 18. The susceptor 16 typically takes the form of a multi-sided, heated body that is rotatable about a vertical axis 20. In practice, the susceptor 16 is made from graphite or the like. Additional heating means (not shown), typically in the form of infrared lamps, surround the enclosure 18 to further heat the susceptor 16.

On each of the sides of the susceptor 16 are pockets, each holding a separate one of a set of wafers 14. In the illustrated embodiment, each side of the susceptor 16 serves to hold three wafers 14a, 14b and 14c at the top, middle and the bottom, respectively. Depending on the overall length of the susceptor 16, a greater or lesser number of wafers 14 could be accommodated.

As the susceptor 16 rotates about its axis, the wafers 14a, 14b and 14c on each susceptor side are exposed to reactant-containing gases admitted into the enclosure 18 through each of a pair of diametrically opposed nozzles 22 and 24 situated at the upper end of the enclosure. The nozzles 22 and 24 are each rotatable through both vertical and horizontal arcs that sweep out vertical and horizontal curved surfaces, respectively, that are each tangent to a successive one of the susceptor sides. As the reactant-containing gases contact each of the wafers 14a, 14b and 14c, layers of atoms, typically silicon, are deposited on each wafer.

To fabricate high quality wafers 14, uniformity of deposition is usually critical, not only across each wafer, but across the wafers 14a and 14b and 14c on each side of the susceptor 16. Accordingly, it is desirable to control the chemical vapor deposition reactor 12 to minimize such variation. In practice, the parameters having the largest influence on the layer thickness variations are the flow of reactant-containing gases through each of the nozzles 22 and 24 as well as the vertical and horizontal nozzle angle orientation. The flow of reactant-containing gas through each of the nozzles 22 and 24 is determined by the degree to which each of a pair of control valves (not shown), associated with a separate one of the nozzles, is opened. To control these parameters, and thereby minimize layer thickness variation, the chemical vapor deposition reactor 12 is responsive to a control vector $c_r$, generated at successive intervals $(r, r+1, r+2 \ldots)$. The control vector $c_r$ includes the following three components $c^1$, $c^2$, and $c^3$:

$$c^1 = \frac{(\text{valve setting nozzle 24} - \text{valve setting nozzle 22}) \times 10}{1/2(\text{valve setting nozzle 24} - \text{valve setting nozzle 22})}$$

$c^2$ = angle of each of nozzles 22 and 24 from horizontal plane $c^3$ = angle of each of nozzles 22 and 24 from vertical plane In general, the controller 10 operates to generate the control vector $c_r$ in accordance with two input vectors, $t_d$, representing a desired set of process outputs, and the second vector $t_r$, representing an actual set of process output values. In the illustrated embodiment, the vector $t_d$ represents a set of desired layer thickness values whereas the vector $t_r$ represents actual wafer thicknesses at a time r.

The vectors $t_d$ and $t_r$ typically each contain five thickness measurements associated with each of the three wafers 14a, 14b and 14c, so that each vector contain fifteen values in all. For each of the wafers 14a, 14b and 14c, the thickness is measured at the center of the wafer, and each of four other points north, east, west and south of the wafer center. The wafer thickness values can be obtained manually, using destructive sampling techniques, or could be obtained using automatic measurement techniques.

The vector $t_d$ is typically generated by an external source (not shown) and is supplied to the controller for input to a processing element 22 that serves to normalize the vector to a mean value $t'_d$ to facilitate processing thereof. Unlike the vector $t_d$ that is immediately normalized, the vector $t_r$, which is generated by the chemical vapor deposition reactor 12, is input to the controller 10 for receipt at a store and forward element 24. The store and forward element 24 acts to delay the receipt of the vector $t_r$ at the processing element 22 by a prescribed time so that the actual process output values received at the processing element effectively represent those process output values generated during the previous interval $r-1$. For this reason, the vector supplied by the store and forward element 24 to the processing element 22 is designated as $t_{r-1}$ so that the normalized value thereof is designated as $t'_{r-1}$.

The purpose in having the processing element 22 normalize the vectors $t_d$ and $t_{r-1}$ to a mean value is to transform the signals for representing the uniformity of layer thickness which is of concern in this process. (Note that the actual value of the mean layer thickness can be controlled by means of other process parameters.) Note that while desirable, normalization of the vectors $t_d$ and $t_{r-1}$ is not critical. Therefore, the processing element 22 could be omitted from the controller 10.

In practice, the vector $t'_{r-1}$ output by the processing element 22 is sampled and compared to the vector $t'_d$ at a gate 26. Should the difference between two vectors fall within a preset tolerance limit, indicating that the actual wafer thicknesses closely correspond to the desired wafer thicknesses, then a signal generator 28 generates a control vector $c_r$ at a fixed level to maintain the chemical vapor deposition reactor 12 in a steady state, so that the reactor continues to produce wafers 14a, 14b and 14c having a substantially uniform thickness. Although useful in the operation of the controller 10, the presence of the gate 26 and the signal generator 28 is not critical to the controller operation. As will be appreciated from a description of the remaining portion of the controller 10 provided below, when $t'_d$ corresponds to $t'_{r-1}$, even in the absence of the gate 26 and signal generator 28, the controller will maintain the chemical vapor deposition system 12 in a steady state. Thus, the gate 26 and signal generator 28, while useful, could be deleted from the controller without any adverse effect on its operation. However, it helps to detect any undesired variation due to other parameter changes and to bring the process back in control.

In the absence of a close correspondence between $t'_d$ and $t'_{r-1}$, the vector $t'_{r-1}$ is inverted and then summed with $t'_d$ at a first summing amplifier 30 that computes the vector difference between them. A scaling amplifier 32 scales the output vector produced by the summing amplifier 30 by a constant k that is typically, although not necessarily, set equal to unity. It may be appropriate to set the value of k to 0.5 or less when a large difference between the actual process characteristics and the inverse model characteristics is expected. The output signal of the scalar 32 is input to a first non-invert input of a second summing amplifier 34 having a second non-invert input supplied with the vector $t'_{r-1}$ generated by the processing element 22. The summing amplifier 34 adds the two input signals supplied to its two inputs and yields an output signal varying with $t'_d$. (In fact when k=1, the output signal of the summing amplifier 34 corresponds exactly to the signal $t'_d$.)

The output signal of the summing amplifier 34, which varies with the vector $t'_d$, is input to a first artificial neural network 36 while the vector $t'_{r-1}$ generated by the processing element 22 is input to a second neural network 38.

The artificial neural networks 36 and 38, each of the feed-forward and error back-propagation type, are identical in structure and operation. (In fact, while the controller 10 has been described as comprising two artificial neural networks 34 and 36, a single one of the networks could be used to process the vectors $t'_d$ and $t_{r-1}$ on a successive basis.) Since the artificial neural networks are identical, only the artificial neural network 36 will be described in detail.

Figure 2:
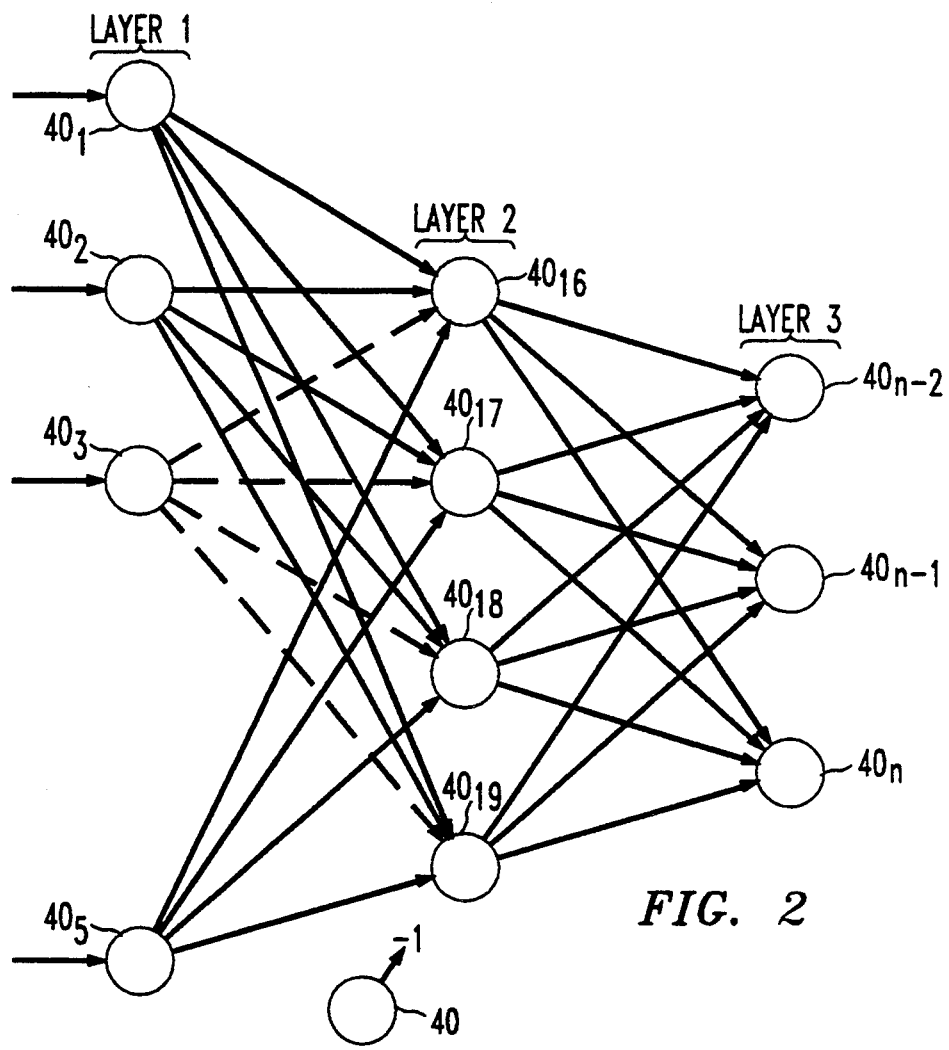
FIG. 2 is a simplified block diagram of one of a pair of neural networks within the controller of FIG. 1.

Referring to FIG. 2, the artificial neural network 36 is comprised of a plurality of nodes $40_1, 40_2, 40_3 \ldots 40_{n-2}, 40_{n \text{ and } 40n}$, where n is an integer dependent on the number of components of the vectors $t_d$, $t_{r-1}$ and $c_r$. The network 36 also includes a bias signal generator 40 which supplies each the nodes $40_{16}$–$40_n$ with a constant level signal, typically $-1$.

The nodes $40_1$–$40_n$ in the artificial neural network 36 are arranged in three separate layers, depicted in FIG. 2 as layers 1, 2 and 3, respectively. There are fifteen nodes ($40_1$–$40_{15}$) in layer 1, which is designated as the input layer because each of the nodes in this layer is supplied with a separate one of the fifteen components of the input signal supplied by the summing amplifier 34 to the artificial neural network 36. In practice, the number of nodes in layer 1 may be greater or smaller than the fifteen nodes shown in FIG. 2 if there is a larger or smaller number of components in the input signal supplied to the artificial neural network 36.

Layer 3 has three nodes $40_{n-2}$, $40_{n-1}$ and $40_n$ and is designated as the output layer because each of the nodes $40_{n-2}$, $40_{n-1}$ and $40_n$ in this layer generates a signal which serves as a separate one of the components of the vector $c_r$ produced by the controller 10. There are four nodes $40_{16}$–$40_{19}$ in layer 2 which is designated as the "hidden" layer because the nodes therein neither receive an external input nor do they supply an external output signal. Instead, each of the nodes $40_{16}$–$40_{19}$ in layer 2 is supplied with the output signal of each of the nodes $40_1$–$40_{15}$ in layer 1. By the same token, instead of generating an external output signal, each of the nodes $40_{16}$–$40_{19}$ supplies its output signal to a separate one of the nodes $40_{n-2}$, $40_{n-1}$ and $40_n$.

The nodes $40_1$–$40_{15}$ in layer 1 act simply to distribute each of the received input signals to a separate one of the nodes $40_{16}$–$40_{19}$ in the second layer. The nodes $40_{16}$–$40_{19}$ and $40_{n-2}$, $40_{n-1}$ and $40_n$ serve to sum the signals before transforming the sum according to a non-linear relationship, for instance a tan-hyperbolic function (tanh).

The network 36 is trained in accordance with a training data set obtained from experiments and/or operational data, so that the network serves as a model of the chemical vapor deposition reactor 12. In other words, the connection weight between the nodes $40_1$–$40_n$ is adjusted, based on the training data presented to the artificial neural network 36, so that the network generates the control vector $c_r$ to drive the chemical vapor deposition reactor 12 to yield the input signals supplied to the network. In this training method, the error signal (i.e., the difference between the actual process output and the estimated neural network output) is back-propagated through the neural network for modifying the connection weights. Such training techniques are well known in the art. For example, the article by G. E. Hinton et al., "Learning Internal Representations by Error Propagation," in the text *Parallel Distributed Processing: Explorations in the Microstructure of Cognition*, Vol. 1 (MIT Press, 1986), herein incorporated by reference. An alternative method for training the inverse process model would be to use a neural network model of a feed-forward process as described in the paper "Supervised Learning and Systems with Excess Degrees of Freedom," COINS Technical Report 88-27, 1988, Department of Computer Science and Information, University of Massachusetts, Amherst, Mass. Using this method, a feed-forward network model is first trained. The error (the difference between the input to the inverse process model and the actual process output) is back-propagated through the feed-forward model and is used to train the inverse process model.

As an alternative implementation, the network 36 could be configured of three separate subnetworks (not shown) each having the same first and second layers but a single-node output layer generating a separate component of $c_r$. The advantage of this approach is that each subnetwork can be more easily trained using a smaller training set. The disadvantage is that the overall network 36 is made larger.

As in any mapping procedure, it is desirable to have a data set (training and test) with a one-to-one or many-to-one mapping where a given input always maps to a given output. This is true in training artificial neural networks as well. The algorithm of the invention is robust to the differences between the predictor and the process if the first and second order statistics do not change sign. This is due to the fact that the predictor output difference is used instead of the output values for predicting the control parameters for the next iteration.

Referring to FIG. 1, the output signal produced by the artificial neural network 36 is supplied to a non-invert input of a summing amplifier 42 that also has an invert input supplied with the output signal of the artificial neural network 38. The summing amplifier 42 generates an output signal in accordance with the difference between the output signals of the artificial neural networks 36 and 38. Since each of the artificial neural networks 36 and 38 generates a control signal in accordance with a separate one of the input vectors $t'_d$ and $t'_{r-1}$, respectively, the output of the summing amplifier 42 thus represents the difference between the two control signals. For this reason, the output signal of the summing amplifier 42 is given the designation $\Delta c_r$.

The output signal produced by the summing amplifier 42, representing the difference between the control signals produced by the artificial neural networks 36 and 38, is input to a first non-invert input of a summing amplifier 44 whose output serves as the control signal $c_r$. The summing amplifier 44 has a second non-invert which is supplied with the output of the summing amplifier, as delayed by a store and forward device 46, identical to the store and forward device 24. The store and forward device effectively serves to supply the second non-invert input of the summing amplifier 44 with the signal $c_r$ generated by the summing amplifier at a previous interval $(r-1)$. Thus the signal supplied to the second input of the summing amplifier 44 is designated as $c_{r-1}$. In this way, the summing amplifier 44 produces the signal $c_r$ at its output in accordance with the sum of $\Delta c_r$ and $c_{r-1}$.

In operation, the controller 10 operates to produce a control signal $c_r$ in accordance with the sum of $c_{r-1}$, representing the control signal generated during the previous interval $r-1$, and $\Delta c_r$, representing the difference between the artificial neural network 36 and 38 output signals. As previously described, each of the artificial neural networks 36 and 38 produces a control signal in accordance with a separate one of the input vectors $t_d$ and $t_{r-1}$, the latter representing actual process output values produced during the interval $r-1$. Thus, the controller 10 operates to control the chemical vapor deposition reactor 12 in accordance with both the actual and desired process output values, which, in the case of the chemical vapor deposition reactor 12, are the actual and desired thicknesses for the wafers 14a, 14b and 14c of FIG. 1, the actual thickness values representing process feedback.

Figure 3:
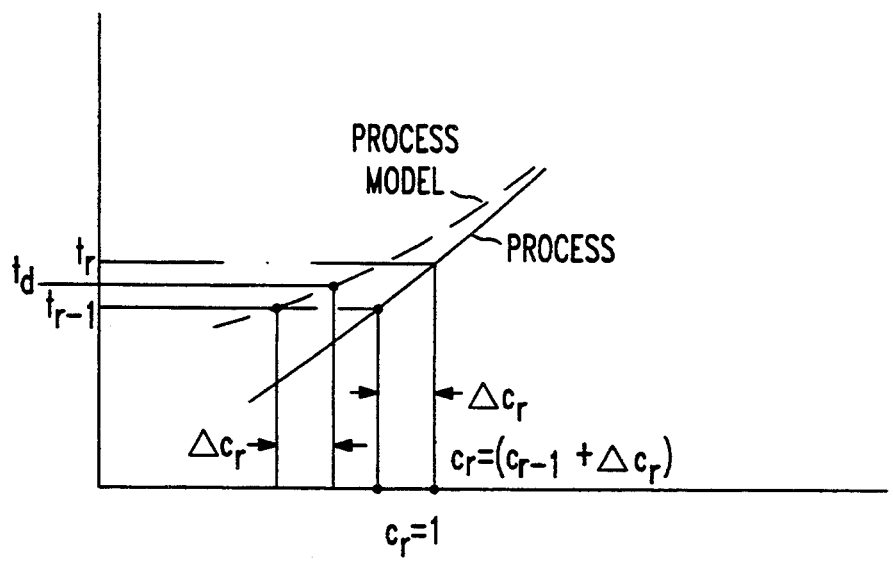
FIG. 3 is a graphical scalar representation of the relationship between the process input values and output values for the controller of FIG. 1

To better understand the manner in which the controller 10 operates, reference should be had to FIG. 3 which shows a pair of plots graphically depicting the relationship between a scalar representation of the control vector $c_r$ input to the chemical vapor deposition reactor 12 and a scalar representation of the process output values (e.g., wafer 14a, 14b and 14c layer thicknesses). The solid plot represents the normally unknown actual relationship between $c_r$ and wafer thickness of the process itself whereas the dashed plot represents the ideal relationship between $c_r$ and wafer thickness, as modelled by each of the artificial neural networks 36 and 38. As depicted in FIG. 3, when the actual value of the control vector input to the chemical vapor deposition reactor 12 is $c_{r-1}$, the actual wafer thicknesses vector corresponds to $t_{r-1}$, not $t_d$, the desired thickness. Using the model of the process, (as represented by the dashed line), it thus becomes necessary to increase the value of the control vector by $\Delta c_r$ in order to achieve wafer thicknesses closer to the desired wafer thickness values $t_d$.

The foregoing describes a controller 10 for controlling a process using both desired and actual process values with at least one, and preferably a pair of artificial neural network 36 and 38.

It is to be understood that the above-described embodiments are merely illustrative of the principles of the invention. Various modifications and changes may be made thereto by those skilled in the art which will embody the principles of the invention and fall within the spirit and scope thereof. For example, while the controller 10 has been described as being configured of individual hardware elements 22–46, the functions of these elements could easily be practiced collectively using a single, general purpose digital computer. Rather than configure the controller 10 of a pair of artificial neural networks 36 and 38 either in hardware or software, a single neural network could be employed to process the output signal of the summing amplifier 34 and the gate 26 in succession.

We claim:

1. A differential process controller for controlling a process at a time r in accordance with both an optimal process output value vector $(t_d)$, whose components represent desired process values, and an actual process value vector $(t_{r-1})$, whose components represent actual process values measured during an immediately previous interval $(r-1)$, comprising:

first processing means supplied with the optimal process output value vector $t_d$ for generating a first vector varying in accordance therewith;

a first artificial neural network for processing the first vector in accordance with past actual process values to yield a first intermediate control vector for controlling the process;

second processing means supplied with the actual process value vector $t_{r-1}$ for generating a second vector varying in accordance therewith;

a second artificial neural network for processing the second vector in accordance with past actual process values to yield a second intermediate control vector for controlling the process;

a first summing amplifier for producing an output vector varying in accordance with the difference between the first and second intermediate control vectors;

a second summing amplifier having a first input supplied with the output vector of the first summing amplifier, and a second input, for generating a control vector for controlling the process in accordance with the sum of the signals at the first and second summing amplifier inputs; and a store and forward means supplied with the control vector from the second summing amplifier for storing said control vector and thereafter supplying said control vector to said second input of said second summing amplifier after a prescribed interval.

2. The apparatus according to claim 1 wherein each of the first and second artificial neural networks comprises:

a first layer of nodes, each receiving a component of an input vector supplied to the artificial neural network and distributing the component of the input vector supplied thereto;

a second layer of nodes, each supplied with the vector component distributed by each of the nodes in the first layer for transforming the vector component supplied thereto; and a third layer of nodes, each supplied with the vector component produced by each of the nodes in the second layer for further transforming the vector components supplied thereto to yield a component of an intermediate control vector.

3. The apparatus according to claim 1 wherein said first processing means comprises:
   a processing element for normalizing the optimal process output vector $t_d$ and the actual process value vector $t_{r-1}$ to a mean value and to yield first and second output vectors, respectively, which vary accordingly;
   a third summing amplifier supplied with the first and second output vectors and generating a third output vector varying in accordance with the difference therebetween;
   scaling means for scaling the third output vector produced by the third summing amplifier by a constant value to yield a fourth output vector;
   a fourth summing amplifier for summing the fourth output vector of the scaling means with the second output vector.

4. The apparatus according to claim 3 further including:
   means for comparing the second output vector to the first output vector; and
   a signal generator for generating a fixed-value control vector for controlling the process when the difference between the first and second output vectors is within a prescribed tolerance value.

5. The apparatus according to claim 1 wherein the second processing means includes a processing element for normalizing the actual process value vector to a mean value.

6. A method for controlling a process at a time r in accordance with both an optimal process output value vector ($t_d$), whose components represent desired process values, and an actual process value vector ($t_{r-1}$), whose components represent actual process values measured during a previous interval ($r-1$), comprising the steps of:
   processing the optimal output value vector $t_d$ to yield a first vector varying in accordance therewith;
   processing the actual process value vector $t_{r-1}$ to yield a second vector varying in accordance therewith;
   applying the first vector to an artificial neural network which sums and transforms the components of the first vector in accordance with past actual process output values to yield a first intermediate control vector;
   applying the second vector to an artificial neural network which sums and transforms the components of the second vector in accordance with past actual process output values to yield a second intermediate control vector;
   generating a differential control vector varying in accordance with the difference between the first and second intermediate control vectors;
   successively generating a final control vector in accordance with the sum of the differential control vector and the final control vector generated during a previous interval.

7. The method according to claim 6 wherein the optimal process value vector is processed by the steps of:
   normalizing the optimal process value vector $t_d$ to a mean value;
   normalizing the actual process output value vector $t_{r-1}$ to a mean value;
   generating a difference vector in accordance with the normalized-to-mean values of the vectors $t_d$ and $t_{r-1}$;
   scaling the difference vector by a constant; and
   summing the scaled difference vector with the mean value of the vector $t_{r-1}$.

8. The method according to claim 6 wherein the actual process output value vector is processed by normalizing it the vector to a mean value.

* * * * *